April 21, 1925.
G. C. PEARCE
1,535,033
DIRECTION INDICATOR
Filed Oct. 25, 1922
2 Sheets-Sheet 1
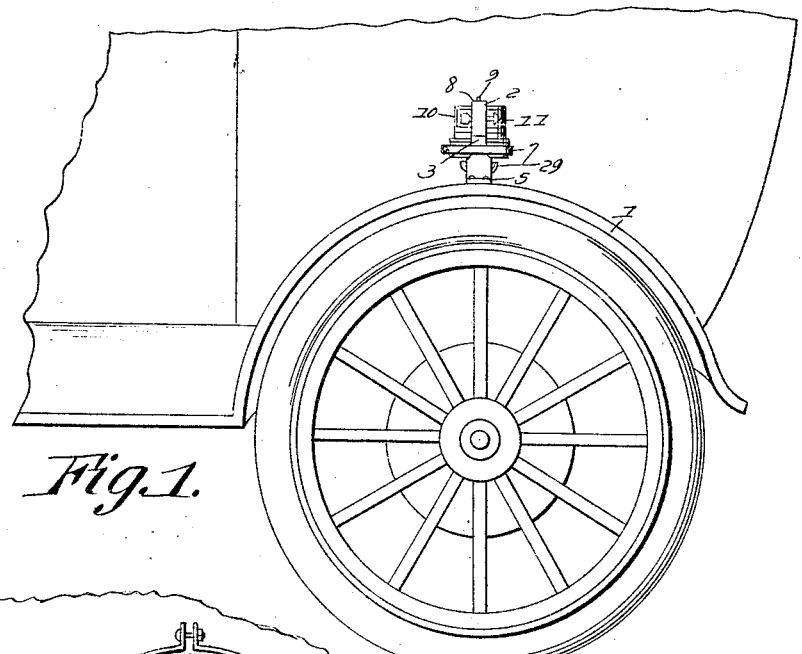
Fig.1.
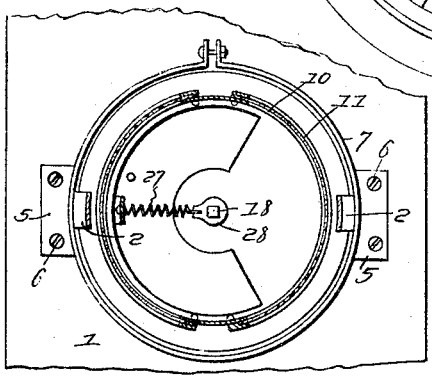
Fig.3.
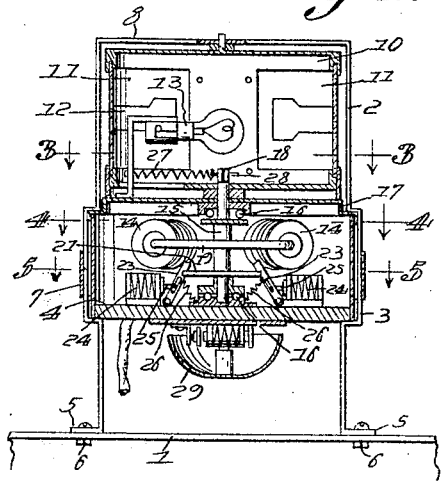
Fig.2.
Fig.4.
Inventor
G. C. Pearce,
By
Attorney April 21, 1925.

G. C. PEARCE 1,535,033

DIRECTION INDICATOR

Filed Oct. 25, 1922

Inventor
G. C. Pearce,

By
Attorney

Patented Apr. 21, 1925.

1,535,033

UNITED STATES PATENT OFFICE.

GEORGE C. PEARCE, OF JOHNSON CITY, TENNESSEE.

DIRECTION INDICATOR.

Application filed October 25, 1922. Serial No. 596,756.

*To all whom it may concern:*

Be it known that GEORGE C. PEARCE, a citizen of the United States of America, residing at Johnson City, in the county of Washington and State of Tennessee, has invented new and useful Improvements in Direction Indicators, of which the following is a specification.

The purpose of the invention is to provide a device of the above mentioned character which is particularly adapted for positioning on any convenient part of a vehicle so that there may be indicated to drivers in the front or rear, wherever the device may be attached, the direction the driver of the equipped machine purposes taking. A further object is to provide means for actuating the indicator so that it may be conveniently operated from the driver's seat and may be assured of positive movement to indicating position and returned and positively retained in neutral position when not in use. A still further purpose contemplates the construction of a device of this character which is simple and which is cheaply manufactured and therefore may not be easily damaged or when damaged easily repaired.

With these purposes in view the invention consists in a construction of parts of which a preferred embodiment is illustrated but to which the invention is not to be restricted further than is prescribed by the appended claim.

In the accompanying drawings:

Figure 1 is a view and side elevation of a rear end of an auto vehicle showing the position of the invention on the rear fender.

Figure 2 is a central vertical sectional view of the indicator.

Figure 5:
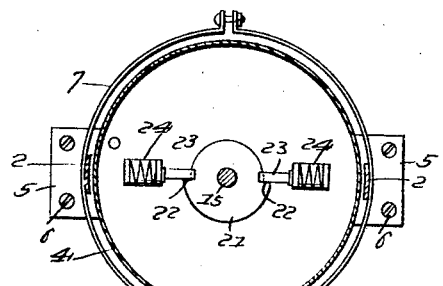

Figures 3, 4 and 5 are horizontal sectional views taken on the planes indicated by the lines 3—3, 4—4 and 5—5 of Figure 2.

Figure 6:
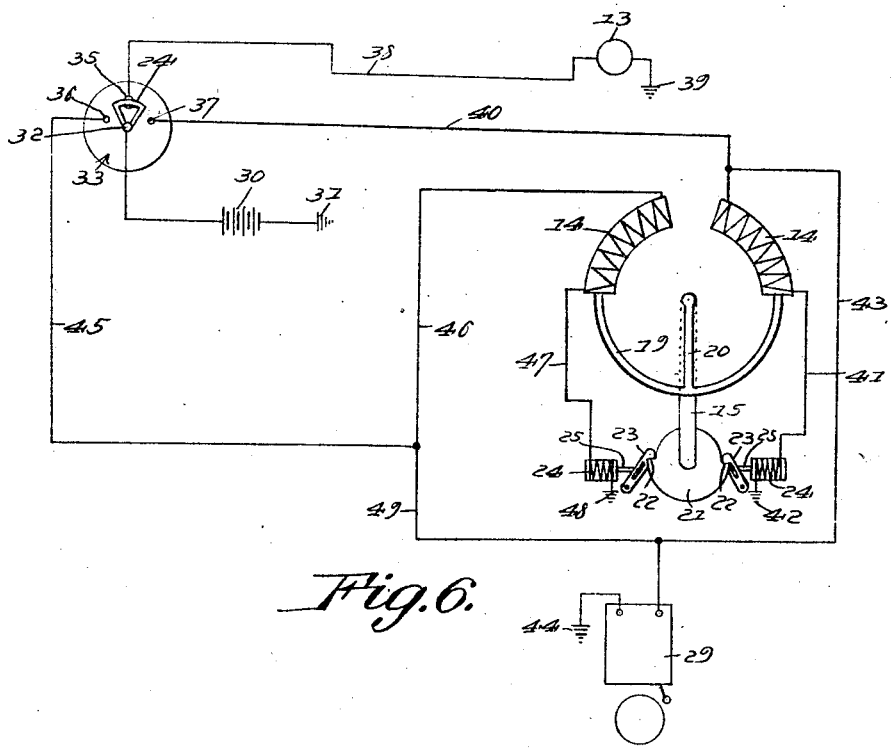

Figure 6 is a diagrammatic view to illustrate the mount in which the device is operated.

While the invention may be applied on any of the appropriate parts of an auto vehicle, it is preferable that it be carried on the rear fender 1 as illustrated in Figure 1 of the drawings. That it may be so mounted, a U-shaped bracket 2 is provided, offset as indicated at 3 to embrace the side wall of a casing member 4, the seat 5 of the bracket being secured to the fender 1 by means of appropriate bolts 6. A clamping ring or strap 7 embraces the wall of the casing 4 which is preferably cylindrical and spans the offset portions 3 of the bracket and thus maintains these offset portions and legs of the bracket in proper position. The crosspiece 8 of the bracket is provided with a central bearing for the reception of pin 9 carried at the upper end of the indicating member 10, the latter also being preferably cylindrical in shape and provided at its side walls with light penetrable plates 11, of which the arrows or other indicators 12 are preferably light with the major portion of the plates dark, preferably dark red.

The cylindrical indicating element 10 is designed for oscillating movement to expose the arrow of one or the other of the plates 11 directly to the rear of the machine, in which position it gets the full benefit of the light 13 disposed within the indicating medium. The means for actuating the indicating medium or element comprises a pair of arcuate electromagnets 14 concentrically arranged with reference to a post 15 mounted in ball bearings 16 disposed centrally within the casing 4, the casing having a removable top 17 held in place preferably frictionally on the casing and also held in place by the offset portion 3 of the bracket. The upper end of the post 15 is cross sectionally angular as indicated at 18 and extends through a corresponding eye in the bottom of the indicating element 10. The indicating element is thus mounted for positive angular movement in correspondence with the angular movement imparted to the post and such angular movement of the latter is had by means of an arcuate core 19 carried at the end of the radial arm 20 connected with the post, the arm connecting with the core 19 at the center of the latter, so that one half of the core may enter with one half of the other of the magnets 14, depending upon which is operated and thus impart angular movement to the extent of 90° to the indicating element which is sufficient to expose to the rear of the machine the desired arrow.

Neutral position of the indicating element is maintained by means of a plate 21 of circular form carried by the post and below the plane of the magnet 14, a segment of the plate being removed at the periphery to provide oppositely disposed shoulders 22. These shoulders are normally engaged by pawls 23 pivotally mounted on the bottom of the casing 4 and one or the other is released for engagement with its corresponding shoulder by means of a solenoid 24, the core or plunger 25 of which has a pivotal connection with the pawl, the latter of which is slotted to preclude binding movement between the plunger and pawl when the latter is actuated to lift or raise the pawl. The pawl is held in position for engagement with the shoulder normally by a spring 26 and it is against this tension that the pawl is released from said shoulder by the actuation of the magnets.

Obviously when both pawls are engaged with their respective shoulders, angular movement of the post is precluded, but if one pawl is raised and the electromagnet or solenoid 14 adjacent that pawl energized, that portion of the arcuate core 19 may be moved into the magnet 14 and the post thus swung to the angular position desired, since the movement of the shoulder 22 is away from the other pawl which has not been raised in the operation. Correspondingly, if the other pawl is raised, the movement of the post and indicating element may take place in the opposite directions.

In order to return the indicating element to neutral or non-indicating position a tension spring 27 is provided and terminally connected to a ring 28 carried by the upper end of the post and angularly moving with the latter, the remaining end of the spring being anchored at a point adjacent the periphery of the indicating element 10. It will be observed that angular movement of the post in either direction tends to create a tension in the spring and thus when the force creating this angular movement is removed, the spring will return the element to neutral position and it will be retained in such position if both pawls 23 are released as it is intended they shall be in the operation of the device when neither of the magnets 14 is energized.

A bell 29 is carried on the bottom of the casing 4 and is designed for operation when the indicating element is being moved to either of its indicating positions.

In Figure 4 there is illustrated a diagrammatic method of wiring for the operation of the invention. The battery 30 constitutes the energizing means for the electromagnets 14 and 24 and also furnished a current for lighting the lamp 13 and ringing the bell 29. This battery may be the storage battery ordinarily employed in connection with automobile work, or it may be a separate and distinct battery. In the present instance it is desired to ground the terminal as indicated at 31, the other terminal being led to the battery connection 32 of a conventional switch 33, the operating medium of which is a sector 34 movable angularly for contact with the contacts 35, 36 and 37. The contact 35 is connected with the lamp through a wire 38 and the opposite terminal of the lamp is grounded as indicated at 39. The contact 37 is connected to one of the electromagnets 14 by a wire 40, this magnet being in series with its associated magnet 24 by means of a wire 41, the opposite terminal of the corresponding magnet 24 being ground as indicated at 42. Connection with the contact 37 is made from the bell 29 by means of a wire 43 which is tapped in on the wire 40 and leads to one terminal of the bell, the opposite terminal of which is grounded as indicated at 44.

The contact 36 is connected with the opposite magnet 14 by means of a wire 45 of which one branch 46 connects with the magnet 14 whose remaining terminal is connected with one of the terminals of the corresponding magnet 24 by means of the wire 47, this magnet 24 being grounded as indicated at 48. The remaining branch 49 of the wire 45 connects with the bell as does the wire 43.

In the operation of the invention, if it is desired to turn in one direction, say the right, the switch sector 34 is turned to the right when it spans the contacts 35 and 37. Current then reaches the battery 30 and reaching the pivot point of the sector traverses the latter to the contact 35 and thence over the wire 38 through the light 13 and the ground 39 back to the battery through the ground 31. The other division of the current traverses the wire 37 and thence the connected magnets 14 and 24 and through the ground 42 back to the battery. Energizing the magnet 24 results in raising its connected pawl 23 which leaves magnet 14 free to move the arcuate core 19 in a direction to swing the indicating element righthandedly. At the same time, however, the current traversing the wire 40 has divided at the point of entrance 14 and traverses over the wire 43 to the bell 29 and thence over the ground 44 back to the battery. Turning the sector 34 in the opposite direction results in the operation of the light as in the previous instance, but also results in the actuation of the opposite magnets 14 and 24, current reaching the latter through the contact 36, wire 45, branch 46, connecting wire 47 and ground 48. The opposite pawl and magnet 14 are thus actuated and the indicating element 10 moves in the opposite direction. The bell is at the same time operated by the current which traverses the branch 49 and returns to the battery through the ground 44.

The invention having been described, what is claimed as new and useful is:

A device for the purpose indicated comprising a cylindrical casing, an angularly movable indicating element surmounting the same, a bracket straddling the casing and the indicating element and having a cross-piece provided with a bearing for the latter, the bracket having legs offset to embrace the casing, and a clamp surrounding the casing and straddling the legs.

In testimony whereof he affixes his signature.

GEORGE C. PEARCE.